United States Patent [19]

Druffel et al.

[11] Patent Number: 4,577,824
[45] Date of Patent: Mar. 25, 1986

[54] FASTENING DEVICE FOR FIXING A BODY TO A STRUCTURAL MEMBER

[75] Inventors: James B. Druffel; Joel S. Cohen, both of Oakland, Calif.

[73] Assignee: Prescolite, Inc., San Leandro, Calif.

[21] Appl. No.: 629,209

[22] Filed: Jul. 9, 1984

[51] Int. Cl.⁴ .............................................. F16L 5/00
[52] U.S. Cl. .................................... 248/544; 248/57; 248/248; 248/DIG. 6
[58] Field of Search ................. 248/544, 546, 547, 57, 248/342, 343, 344, 345, DIG. 6, DIG. 9, 247, 248, 300; 362/294, 276

[56] References Cited

U.S. PATENT DOCUMENTS

| 1,599,252 | 9/1926 | Simpson | 248/248 |
| 1,850,616 | 3/1932 | Barnett | 248/57 |
| 2,964,279 | 12/1960 | Galloway | 248/546 |
| 3,214,126 | 10/1965 | Roos | 248/57 |
| 3,499,359 | 3/1970 | Yrjanainen | 248/546 |
| 4,165,851 | 8/1979 | Bowden | 248/57 |
| 4,388,677 | 6/1983 | Druffel | 362/294 |

Primary Examiner—Reinaldo P. Machado
Assistant Examiner—Alvin Chin-Shue
Attorney, Agent, or Firm—Bielen & Peterson

[57] ABSTRACT

The fastening device which employs an end element connected to a body to be supported to a structural member. The element has first and second sides and edges, and includes a portion for penetrating the structural member. The element is positioned in relation to the structural member by guides on either side of the element.

6 Claims, 7 Drawing Figures

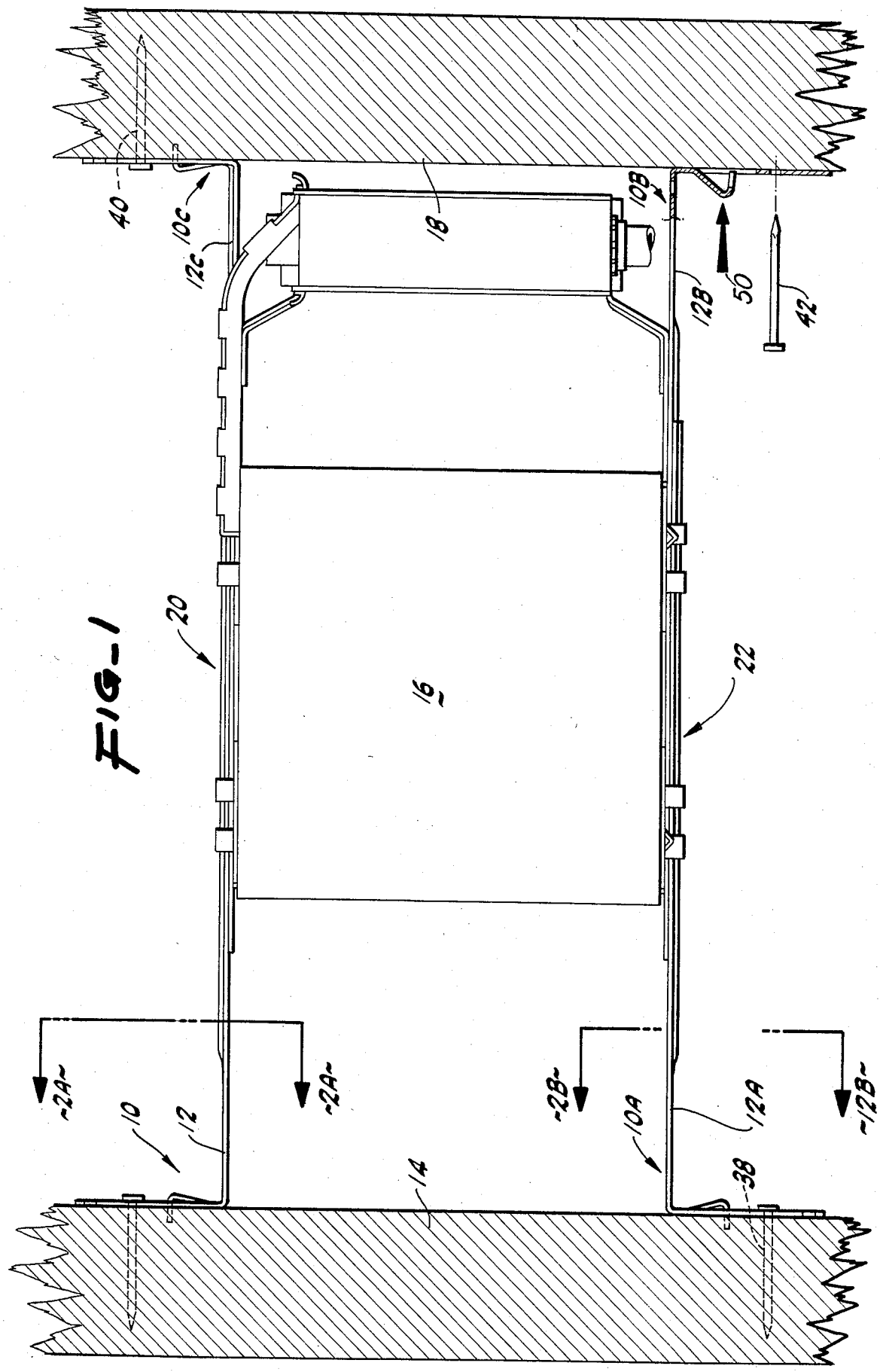

"RIGHT-HAND"

"LEFT-HAND"

FASTENING DEVICE FOR FIXING A BODY TO A STRUCTURAL MEMBER

BACKGROUND OF THE INVENTION

The present invention relates to a novel fastener for fixing a body such as a bar hanger to a structural member.

Bar hangers are used to hold mechanical and electrical mechanisms to structural members such as beams, joist, and the like normally found in buildings and other structures. In particular bar hangers are used to hold electrical lighting units in place. Reference is made to U.S. patent application, Ser. No. 222,042, filed Jan. 2, 1981, U.S. Pat. No. 4,388,677, which describes a typical bar hanger used for this purpose.

Prior art bar hangers often included fasteners at the end portion thereof which were difficult to fasten and align with the structural members of the building, such as the joists. Also, bar hangers of this type required the manufacture of left-hand and right-hand components which were often confusing to the ulitimate user of the same and added greatly to the manufacturing cost. In addition, fabrication of the bar hanger components often produced a great deal of scrap which wasted a great deal of material.

A fastener having universal qualities in conjunction with a bar hanger would be a great advance in the electrical and mechanical arts.

SUMMARY OF THE INVENTION

In accordance with the present invention a novel and useful fastener for fixing a body such as a bar hanger to a structural member is provided.

The structural member may be in the form of a beam, joist, and the like having an edge. The end element connected to the body includes first and second sides with the first and second edges respectively. Means is also provided for penetrating the structural member in order to hold the end piece and body to the same.

The fastener of the present invention also includes means for guiding the position of the end element in relation to the edge of the structural member. The guiding means includes a pair of edges each capable of being aligned with the structural member. One of the edges of the guiding means is connected to the first side of the element while the other edge of the guiding means is connected to the other side of the element. Both edges of the guiding means are positioned outwardly from the respective both edges of the end element.

The first side of the end element includes a notch between the first edge of the first side of the end element and the first edge of the guiding means. The notch is of the size to fit the second edge of the guiding means. Where the first edge of the first side of the end element and the first side of the guiding means are substantially straight an parallel to one one another, the notch possesses a certain depth. The depth of the notch is measured along a line perpendicular to a line coincident with the first edge of the first side of the end element. Also, the second edge of the second side of the end element and the second edge of the guiding means may be substantially straight edges. Lines coincident with these edges are substantially parallel to one another and are separated from one another a certain distance measured along a line perpendicular to and between these coincident lines. This certain distance of separation would be substantially equal to the depth of the notch heretofore described.

Further, the first edge and the first side of the end element and the first edge of the guiding means would define line coincident therewith and be separated from one another. Such separation would be measured along a line perpendicular to and between such coincident lines. The depth of the notch and the distance between the first and second edges of the guiding means and the first and second edges of the end element as defined hereinabove, would present three distances or dimensions which would be equal to one another. Thus, the fastener of the present invention may have a universal nature and could guide the left or right side of a body fastened to the end element. Also, a multiplicity of such end elements may be fashioned from a single sheet of material with very minimal waste between successive end elements.

The means for penetrating the structural member may include a portion which is split from the end element and bent outwardly therefrom. Such means would not present any impediments to the aliging of the guiding means with the structural member.

It may be apparent that a novel and useful fastener for fixing a body to a structural member has been described.

It is therefore an object of the present invention to provide a fastener for fixing a body to a structural member which may be used on either side of the body being fixed to the structural member.

It is another object of the present invention to provide a fastener for fixing a body to a structural member which may be formed from material with the minimum amount of waste as a result of such forming process.

Another object of the present invention is to provide a fastener for fixing a body to a structural member which includes a temporary fixing means and a permanent fixing means which cooperates with means for positioning the fastener in relation to the structural member.

The invention possesses other objects and advantages especially as concerns particular characteristics and features thereof which will become apparent as the specification continues.

BRIEF DESCRIPTION OF THE DRAWINGS

FIG. 1 is a top plan view of the fastener device of the present invention in use as bar hangers for supporting an electrical fixture.

For a better understanding of the invention reference is made to the hereinafter described description of the embodiments thereof which should be taken in conjunction with the hereinabove described drawings.

DESCRIPTION OF THE PREFERRED EMBODIMENTS

Various aspects of the invention will evolve from the following detailed description of the preferred embodiments thereof which should be referenced to the hereinabove described drawings.

Figure 2A:
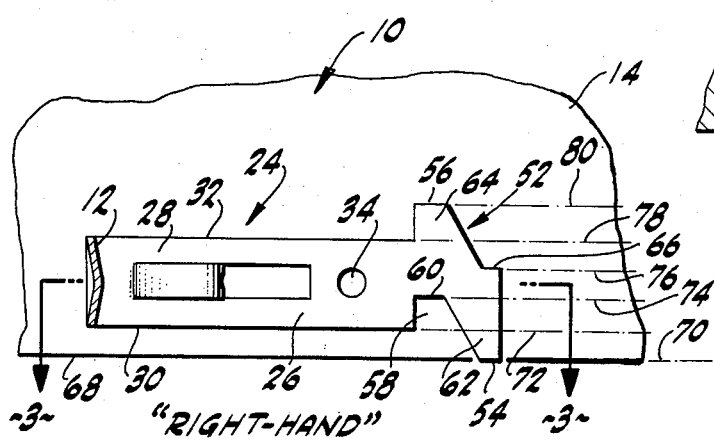
FIG. 2A is a view taken along line 2A—2A of FIG. 1.

The invention as a whole is shown in the drawings and denoted by reference character 10. The fastener 10 is employed to hold the body 12 to a structural member 14. As depicted in FIG. 1, structural member 14 may be a wooden beam or joist. Body 12 can be a bar hanger of the type shown in U.S. Pat. No. 4,388,677 to Druffel. An electrical fixture 16 is held between joist 14 and 18 by bar hanger pairs 20 and 22. Body 12 may be one of the sliding members of bar hanger 20. Turning to FIG. 2A, it may be seen that fastener 10 has an end element 24 which in integrally formed with body 12 at approximately the right angle. End element 24 has a first side 26 and a second side 28. The first and second sides 26 and 28 terminate at straight edges 30 and 32 respectively. Opening 34 provides a nail hole for permanent fastening of end element 24 to structural members 14 and 18. For example nails 36, 38, 40, and 42 are used for this purpose.

Figure 3:
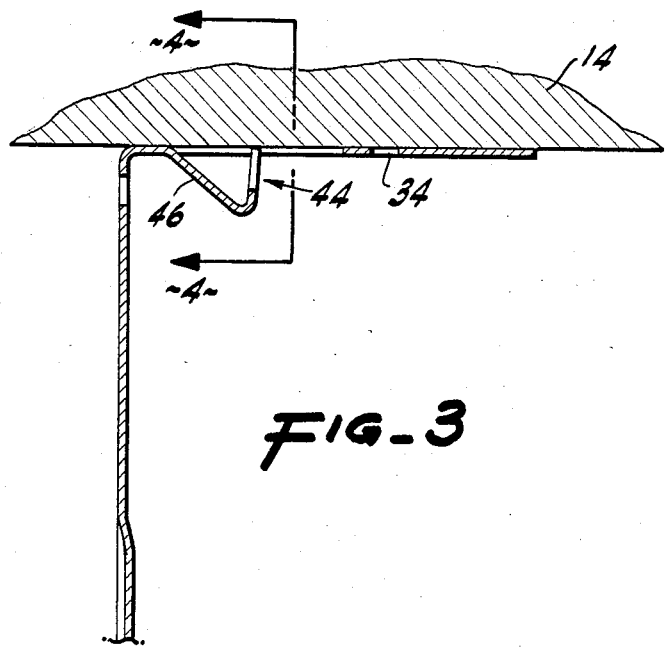
FIG. 3 is a view taken along line 3—3 of FIG. 2A.

Means 44 is also provided for penetrating these structural members 14 and 18. Means 14 may take the form of a split member 46 having a two prong end 48 which spreads upon traveling through structural member 14, FIGS. 3, 4, and 5. Directional arrow 50, FIG. 5 indicates the force required to cause penetration of end 48. Means 44 would be used to hold end element 24 in place temporarily after alignment which would be hereinafter discussed.

Attached to end element 24 is guiding means 52, FIG. 2A. Guiding means 52 aids in the alignment of and spacing of end element 24 from the edge 68 of joist 14, which is the structural element in this case. Guiding means includes edges 54 and 56 which are straight. Edges 54 and 56 are connected to and associated with sides 26 and 28 of end piece 24 respectively. Both edges 54 and 56 of guiding means 52 are positioned outwardly from end element 24, specifically edges 30 and 32.

Figure 2B:
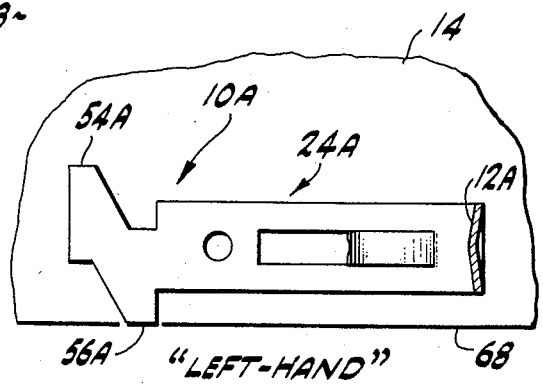
FIG. 2B is a view taken along line 2B—2B of FIG. 1.

Guiding means 52 would be defined to include a notch 58 which has a floor 60. In addition, guiding means 52 is formed with a protrusion 62 and a protrusion 64 which extends outwardly from the first and second sides 26 and 28 of end element 24. A plateau 66 is found at the base of protrusion 64. As depicted in FIG. 2A, edge 54 aligns with the edge 68 of structural member 14. Turning to FIG. 2B, it may be observed that end element 24 has been turned 180° such that edge 56 aligns with the edge 68 of structural member 14. Thus, end element 24 may be used with body 12 in the form of a bar hanger as the "left-hand" or "right-hand" fastener. The use of end element 24 in FIG. 2B has been identified as fastener 10A. Also, the portions of fastener identified by the same reference character of the portion shown for fastener 10, FIG. 2A, since they are similar.

Returning to FIG. 2A it may be apparent that a series of parallel lines 70, 72, 74, 76, 78, and 80 are formed by being coincident with edge 54, edge 30, floor 60, plateau 66, edge 32 and edge 56, respectively. The distance between any two successive lines is equaled to the distance between any other two successive lines. For example, the distance between line 72 and line 74, measuring the depth of notch 58 is equaled to the distance between lines 78 and 80 which is the height of protrusion 64.

Figure 6:
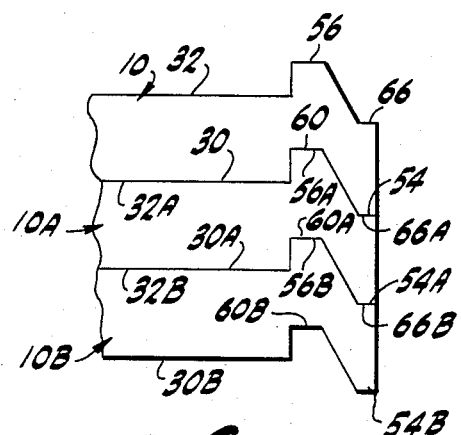
FIG. 6 is a broken top plan view showing the formation of a multiplicity of fastener end portions from a piece of material.

Turning to FIG. 6, it may be seen that this provision permits fasteners 10, 10A and 10B to be cut from a single sheet of material with a minimum of waste. In other words, fasteners 10, 10A and 10B nest adjacent one another.

Returning to FIG. 1, fasteners 10 and 10B are used in the "right-hand" configuration in relation to the joist 14 and 18. Also, fasteners 10A and 10C are being used in the "left-hand" configuration. As has been described heretofore, fasteners 10, 10A, 10B and 10C are interchangeable with one another, having a universal characteristic in this regard.

Figure 4:
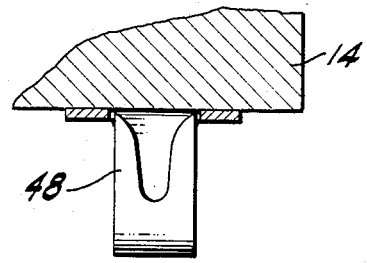
FIG. 4 is a view taken along line 4—4 of FIG. 3.
Figure 5:
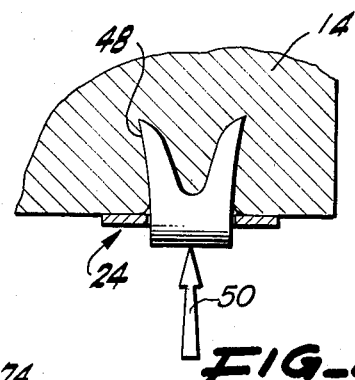
FIG. 5 is a similar view to FIG. 4 showing movement of the penetrating means into the structural member.

In operation the user aligns either edge 54 or edge 56 of fastener 10 with the edge 68 of structural member 14. Such alignment positions the end element 24 to the proper height in relation to joist 14. Means 44 is employed by striking the same as shown in FIGS. 4 and 5 it temporarily holds the end element 24 to joist 14. A nail or other fastener is than hammered through nail hole 34 to permanently hold end element 24 of fastener 10 in place. The same procedure is performed with fasteners 10A, 10B and 10C to hold electrical fixture 16 in place.

While in the foregoing embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A fastener for fixing body to a structural member having an edge comprising:
 a. an end element connected to the body, said element having a first side and a second opposite side with first and second edges spaced from one another along a certain direction respectively;
 b. means for penetrating the structural member said means being connected to said end element;
 c. means for guiding the position of said end element in relation to the edge of the structural member, said guiding means including first and second edges each capable of being aligned with the edge of the structural member, said guiding means being formed as a portion of said end element, said first edge of said guiding means lying outwardly from said first edge of said first side of said end element along said certain direction, and said second edge of said guiding means lying outwardly from said second edge of said opposite second side of said end element along said certain direction.

2. The fastener of claim 1 in which said first side of said end element includes a notch between said first edge of said first side of said end element and said first edge of said guiding means, said notch being of the size to fit said second edge of said guiding means.

3. The fastener of claim 2 in which said first edge of said first side of said end element and said first edge of said guiding means are substantially straight edges and are parallel to one another, and said notch possesses a certain depth measured along a line perpendicular to a line coincident with said first edge of said first side of said end element.

4. The fastener of claim 3 in which said second edge of said second side of said end element and said second edge of said guiding means are substantially straight edges such that lines coincident thereto are substantially parallel to one another, and are separated from one another a certain distance measured along a line perpendicular thereto and therebetween, said certain distance of separation between lines coincident with said second edge of said end element and said second edge of said guiding means being substantially equals to said certain depth of said notch.

5. The fastener of claim 3 in which lines coincident with said first edge of said first side of said end element and said first edge of said guiding means are separated from one another a certain distance measured along a line perpendicular thereto and therebetween, said certain distance being equal to said depth of said notch.

6. The fastener of claim 4 in which said means for penetrating the structural member includes a portion split from said end element, said split portion being bent outwardly from said end element.

* * * * *